Nov. 26, 1957  D. P. LITZENBERG  2,814,254

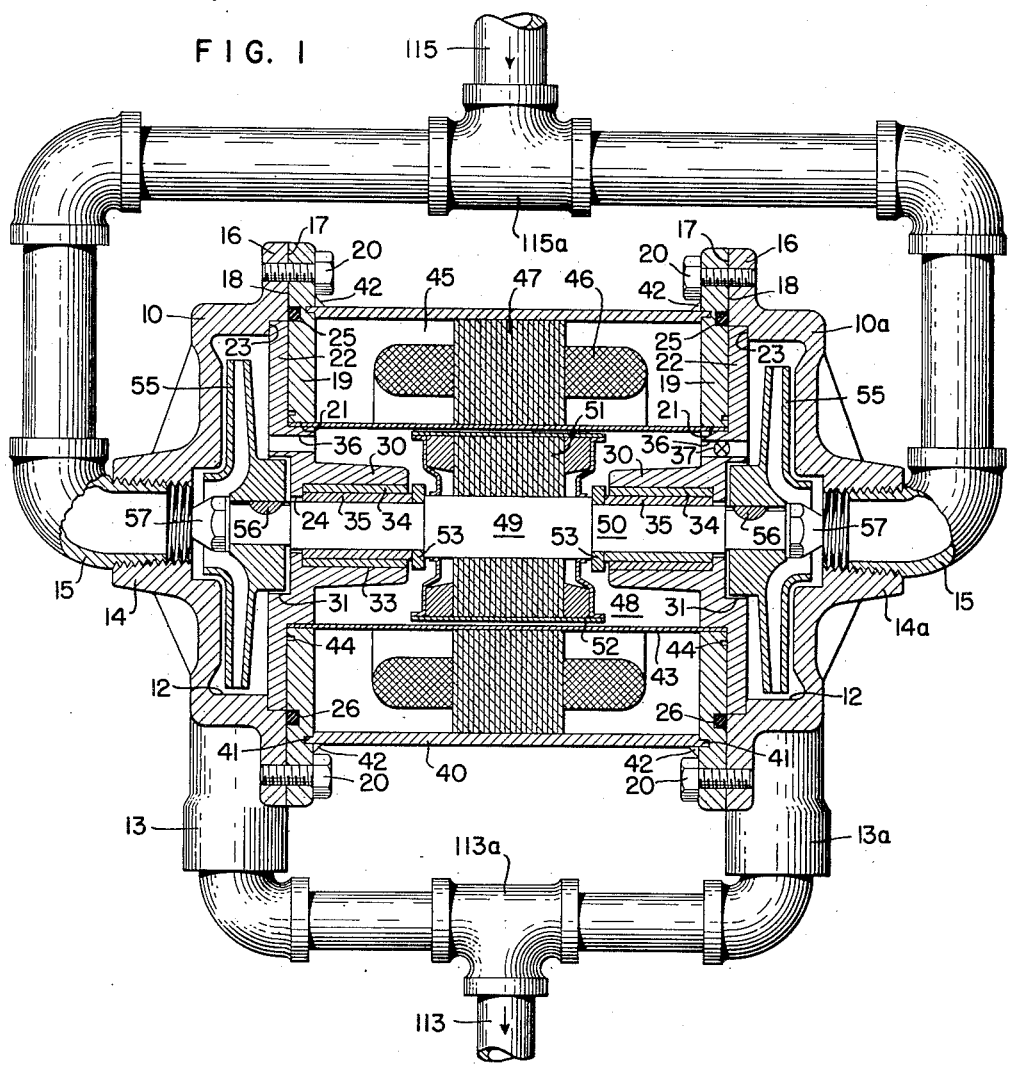

MOTOR DRIVEN PUMPS

Filed April 16, 1954  2 Sheets-Sheet 2

INVENTOR.
DAVID P. LITZENBERG
BY
ATTORNEY.

United States Patent Office 2,814,254
Patented Nov. 26, 1957

2,814,254

MOTOR DRIVEN PUMPS

David P. Litzenberg, Meadowbrook, Pa.

Application April 16, 1954, Serial No. 423,568

14 Claims. (Cl. 103—87)

This invention relates to motor driven pumps.

It is the principal object of the present invention to provide a motor driven pump having a plurality of impellers with a motor rotor therebetween and with the motor stator isolated from the fluid being pumped.

It is a further object of the present invention to provide a motor driven pump of relatively simple, sturdy construction.

It is a further object of the present invention to provide a motor driven pump having a plurality of spaced impellers in which the thrust forces are balanced to minimize the wear of bearing parts.

It is a further object of the present invention to provide a motor driven pump having a plurality of spaced impellers with fluid circulation therebetween for cooling the motor rotor and for other purposes.

Other objects and advantageous features of the present invention will be apparent from the specification and claims.

The nature and characteristic features of the invention will be more readily understood from the following description, taken in connection with the accompanying drawings forming part hereof, in which:

Figure 1 is a view, partly in front elevation and partly in vertical central section taken approximately on the line 1—1 of Fig. 2, showing a preferred embodiment of the invention with the fluid impellers in parallel arrangement;

It should, of course, be understood that the description and drawings herein are illustrative merely and that various modifications and changes can be made in the structures disclosed without departing from the spirit of the invention.

Like numerals refer to like parts throughout the several views.

Figure 2:
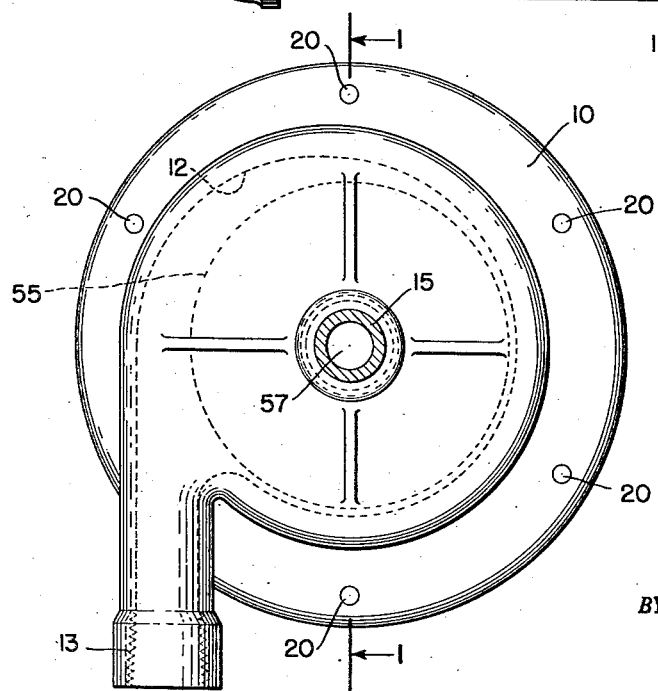
Fig. 2 is a side elevational view of the motor driven pump shown in Fig. 1.

Referring now more particularly to Figs. 1 and 2 of the drawings, a pair of spaced pump housings 10 and 10a are provided each having a volute 12 and fluid delivery connections 13 and 13a and central axial fluid inlet connections 14 and 14a. Each of the inlet connections 14 and 14a has a fluid supply pipe 15 connected thereto.

The housings 10 and 10a each has an integral annular diametrically disposed flange 16 with an inwardly disposed diametrical face 17 for engagement with the outer portions of one side face 18 of a flat cylindrical plate 19. The flanges 16 and plates 19 are secured together preferably by a plurality of spaced bolts 20 suitably circumferentially disposed. The plates 19 each has a centrally disposed opening 21 therethrough in axial alignment with the fluid inlet connection 14 of the housing 10.

A cylindrical disc 22 is provided positioned within each of the housings 10 and 10a and secured therein in circumferential engagement in annular recesses 23. The discs 22 are each in face to face engagement with a corresponding portion of one of the plates 19 and each has a central opening 24 therethrough in concentric arrangement with the corresponding openings 21 in the plates 19.

An annular groove 25 is provided in the face 18 of each of the plates 19 just beyond the outer rims of the discs 22 within each of which a sealing ring 26, such as a conventional O-ring, is positioned to prevent fluid leakage at these locations.

A hollow cylindrical hub 30 is provided, integral with each of the discs 22, with an annular recess 31 at the outer end thereof, and an inner recess 33 for the reception of hollow cylindrical metallic bearing sleeves 34 within each of which a hollow bearing cylinder 35 of carbon or the like is mounted, the bearing cylinders 35 extending inwardly beyond the sleeves 34.

Each of the discs 22 has a fluid port 36 therethrough and one of the ports 36 may have a restriction 37, preferably adjustable or variable, provided therein for purposes to be explained.

A cylindrical motor housing 40 is provided extending between and positioned within suitable grooves 41 in the plates 19 spaced inwardly from the peripheries thereof and is preferably secured thereto by welding, as at 42. Concentrically disposed within the housing 40 a thin-walled cylindrical sleeve 43 preferably of stainless steel or other non-magnetic and non-corrosive material is provided extending between and in abutting engagement with the discs 22 at the innermost portions thereof. The end portions of the sleeve 43 are interposed between the outermost surfaces of the hubs 30 and the innermost surfaces of the discs 19. The sleeve 43 is welded to the discs 19 at both its ends, welding grooves 44 being provided for the purpose. A fluid tight seal is thus provided at these locations.

By the welding of the motor housing 40 and the sleeve 43 to the plates 19 a sealed fluid tight motor stator chamber 45 is thus provided within which stator windings 46 and field laminations 47 are inserted prior to closing. The windings 46 are connected to any suitable source of alternating current by power leads (not shown).

The space within the interior of the sleeve 43 provides a motor rotor chamber 48.

A rotatable shaft 50 is provided of maximum diameter at the central portion 49 thereof on which a motor rotor 51 is provided, preferably of the short circuited type, and as illustrated may be enclosed within a motor rotor housing 52 of corrosion resistant material.

The shaft 50 has portions of smaller diameter on each side of the central section 49 which extend into the bearings 35, thrust rings 53 being interposed between the ends of the bearing cylinders 35 and the central portion 49.

Within the chambers provided in the housings 10 and 10a, impellers 55 are mounted on the shaft 50 and are held in position by keys 56 and nuts 57 on the terminal ends of the shaft 50.

The impellers 55 are preferably identical in their characteristics or substantially so within normal tolerances.

The supply pipes 15 are preferably connected to a common supply pipe 115 by a T-connection 115a and fluid delivery connections 13 are preferably connected through pipes 13c to a common delivery pipe 113 by a T-connection 13a.

Figure 3:
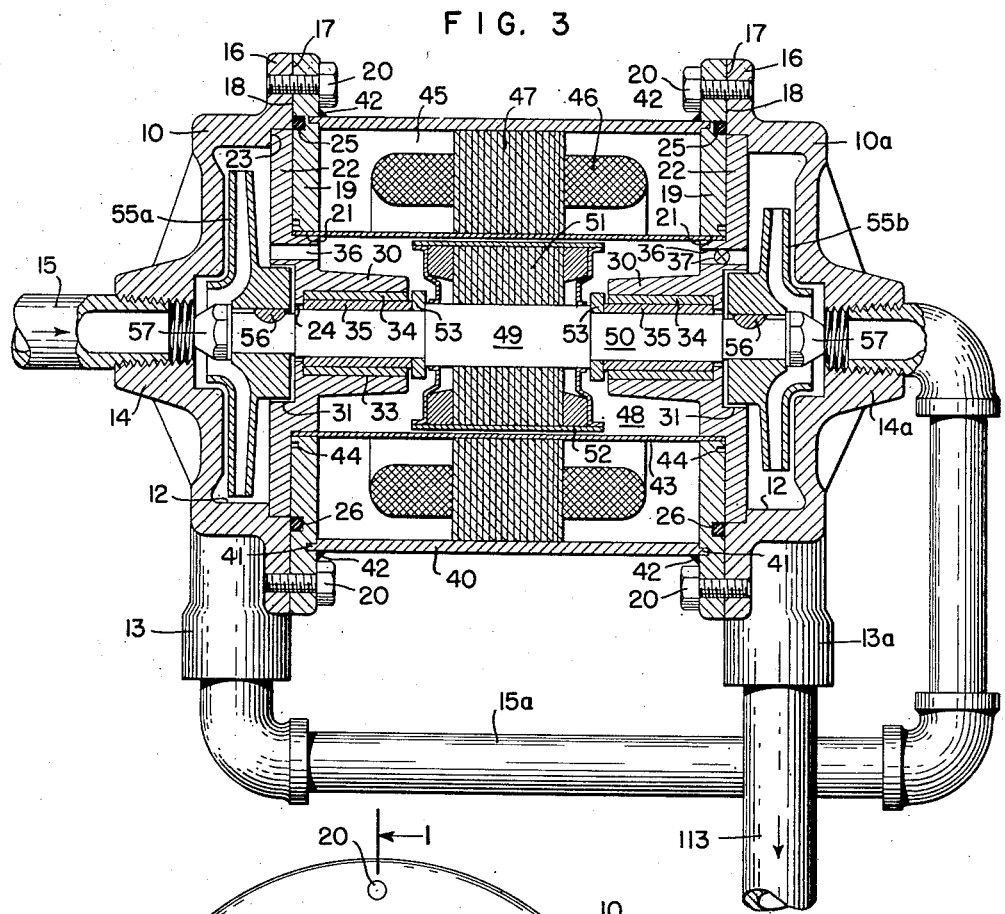
Fig. 3 is a view similar to Fig. 1 showing another preferred embodiment of the invention with the fluid impellers connected in a series or multi-stage arrangement.

Referring now more particularly to Fig. 3 of the drawings the structure there shown is substantially the same as that shown in Fig. 1 with the exception of the fluid impellers and the fluid supply and delivery connections.

The shaft 50, at one end thereof, shown for purposes of illustration as at the left, has a low pressure or first stage impeller 55a secured thereto and at the other end has a higher pressure or second stage impeller 55b secured thereto. In order to equalize the axial thrusts due to the fluid pressures effective on the impellers 55a and 55b the impeller 55b is made of such reduced diameter or area so that the axial thrust on the shaft 50 is equal or substantially equal to that of the impeller 55a.

The fluid inlet connection 14 has the supply pipe 15 connected thereto and the delivery connection 13 is connected by a pipe 15a to the fluid inlet connection 14a. The fluid delivery connection 13a has the delivery pipe 113 connected thereto.

The housings 10 and 10a and the discs 22 and their hubs 30, as well as the piping, can be made of any desired material which is resistant to corrosion by the liquid to be pumped, such as forged stainless steel, bronze and the like. The plate 19 is preferably of forged stainless steel so as to permit of the welding thereto of the sleeve 43.

The mode of operation will now be pointed out.

Upon energization of the stator windings 46 the field set up in the field laminations 47 is effective on the motor rotor 51 for effecting rotation of the shaft 50.

Referring now to Figs. 1 and 2, fluid from the supply pipe 115 is distributed through the pipes 15 to the inlet connections 14 and 14a where it is delivered to the impellers 55. The fluid from the impellers is delivered through the fluid delivery connections 13 and 13a, through the pipes 13c and the T-connection 113a to the delivery pipe 113.

The distribution of the work load between the impellers 55 effects an equal distribution of the radial loads on the bearings and also equalizes the axial thrust so that the thrust on the thrust rings 35 is minimized.

A slight differential of pressure will exist between the chambers for the impellers 55 which will effect circulation through one of the ports 36, the motor rotor chamber 48, and the other of the ports 36, from the higher to the lower pressure region. If by accident the pressures in the two impeller chambers were equal, although this does not ordinarily occur even with impellers made to relatively close tolerances then another impeller should be substituted or one of the impellers modified slightly to provide the desired differential. The fluid thus circulated is effective for cooling the motor rotor 51.

Referring now to Fig. 3, fluid from the supply pipe 15 is delivered through the inlet connection 14 to the impeller 55a, discharged through the fluid delivery connection 13 and from the pipe 15a is delivered through the fluid inlet connection 14a to the impeller 55b. Fluid from the impeller 55b is delivered through the delivery connection 13a to the pipe 113.

The balancing of the work loads of the impellers 55a and 55b as before effects an equal distribution of the radial loads on the bearings and also equalizes the axial thrust.

Fluid, because of the differential of pressure between the impeller chambers for the impellers 55a and 55b, will circulate through the motor rotor chamber 48 for cooling, as controlled by the setting of the restriction 37.

The isolation both of the motor rotor 51 and of the motor stator chamber 45 from the fluid being pumped makes the pump herein disclosed particularly suitable for use in the chemical field for corrosive and low surface tension fluids.

I claim:

1. A motor driven pump comprising a pair of spaced pump housing members having fluid inlet and outlet connections and fluid impeller chambers therein, spaced motor housing plates secured to said pump housing members, a motor housing member extending axially between and secured to said motor housing plates in fluid tight relation, a cylindrical sleeve spaced inwardly from said motor housing member and secured to said housing plates in fluid tight relation, the space between said motor housing member, said sleeve and said spaced housing plates providing a closed motor stator chamber and the space in the interior of said sleeve providing a motor rotor chamber, a motor stator in said motor rotor chamber, hubs carried by said spaced housing members and said plates and extending inwardly within said motor rotor chamber, and a shaft journalled in said hubs and having a motor rotor at the central portion thereof and between said hubs and an impeller thereon in each of said impeller chambers.

2. A motor driven pump as defined in claim 1 in which the fluid inlet connections are connected to a common source.

3. A motor driven pump as defined in claim 1 in which the fluid outlet connection of one housing member is connected to the fluid inlet of the other housing member.

4. A motor driven pump as defined in claim 1 in which the fluid impellers have substantially the same axial forces effective thereon.

5. A motor driven pump as defined in claim 1 in which the hubs have ports therethrough for providing communication between the impeller chambers and the motor rotor chamber.

6. A motor driven pump comprising a pair of axially spaced pump housing members each having fluid inlet and outlet connections and fluid impeller chambers therein, spaced motor housing plates secured to said pump housing members, a motor housing member extending axially between and secured to said housing plates in fluid tight relation, a cylindrical sleeve of non-magnetic material spaced inwardly from said motor housing member and secured to said housing plates in fluid tight relation, the space between said motor housing member, said sleeve and said housing plates providing a sealed motor stator chamber and the space in the interior of said sleeve providing a motor rotor chamber, a motor stator in said motor stator chamber, axially aligned hubs carried by said spaced housing members extending inwardly within said motor rotor chamber, bearings mounted in said hubs, a shaft journalled in said bearings and having a motor rotor at the central portion thereof and between said bearings and an impeller thereon in each of said impeller chambers.

7. A motor driven pump as defined in claim 6 in which axial thrust members are interposed between the central portion of said shaft and said bearings.

8. A motor driven pump comprising a pair of spaced housing members having fluid inlet and outlet connections and fluid impeller chambers therein, end plate members in engagement with the inner faces of said housing members, a motor housing member extending between and secured to said end plate members in fluid tight relation, a cylindrical sleeve spaced inwardly from said motor housing member and extending between and secured to said end plate members in fluid tight relation, the space between said motor housing member, said sleeve and said plate members providing a closed motor stator chamber and the space in the interior of said sleeve providing a motor rotor chamber, a motor stator in said motor stator chamber, additional end plate members within the interiors of said housing members and in engagement with said first mentioned end plate members, hubs carried by said additional end plate members extending inwardly within said motor rotor chamber, a shaft journalled in said hubs and having a motor rotor at the central portion thereof and between said hubs and an impeller thereon in each of said impeller chambers.

9. A motor driven pump as defined in claim 8 in which the additional end plate members have ports therethrough for providing communication between the impeller chambers and the motor rotor chamber.

10. A motor driven pump as defined in claim 8 in which sealing members are interposed between said spaced housing members and said end plate members outwardly with respect to the impeller chambers.

11. A motor driven pump comprising a pair of spaced housing members having fluid inlet and outlet connections and fluid impeller chambers therein, end plate members in engagement with the inner faces of said housing members, a motor housing member extending between and secured to said end plate members in fluid tight relation, a cylindrical sleeve spaced inwardly from said motor housing member and extending between and secured to said end plate members in fluid tight relation, the space between said motor housing member, said sleeve and said plate members providing a closed motor stator chamber and the space in the interior of said sleeve providing a motor rotor chamber, a motor stator in said motor stator chamber, additional end plate members within the interiors of said housing members and in engagement with said first mentioned end plate members, hubs carried by said additional end plate members extending inwardly within said motor rotor chamber, bearings mounted in said hubs, a shaft journalled in said bearings and having a motor rotor at the central portion thereof and between said bearings and an impeller thereon in each of said impeller chambers.

12. A motor driven pump as defined in claim 11 in which the fluid impellers have the same effective areas, and fluid inlet connections are connected to a common source.

13. A motor driven pump as defined in claim 11 in which one of the fluid impellers is a low pressure impeller and the other is a high pressure impeller and the fluid outlet connection of the impeller chamber for the low pressure impeller is connected to the fluid inlet of the other impeller chamber.

14. A motor driven pump as defined in claim 11 in which the additional end plate members have ports therethrough for providing communication between the impeller chambers and the motor rotor chamber, and sealing members are interposed between the spaced housing members and said end plate members outwardly with respect to the impeller chambers.

References Cited in the file of this patent

UNITED STATES PATENTS

| | | |
|---|---|---|
| 2,546,034 | Lansing | Mar. 20, 1951 |
| 2,669,187 | Guyer | Feb. 16, 1954 |

FOREIGN PATENTS

| | | |
|---|---|---|
| 641,405 | France | Oct. 3, 1928 |